United States Patent [19]

Hall

[11] Patent Number: 5,376,200
[45] Date of Patent: Dec. 27, 1994

[54] METHOD FOR MANUFACTURING AN INTEGRAL THREADED CONNECTION FOR A COMPOSITE TANK

[75] Inventor: Ivan K. Hall, San Diego, Calif.
[73] Assignee: General Dynamics Corporation, San Diego, Calif.
[21] Appl. No.: 113,879
[22] Filed: Aug. 30, 1993
[51] Int. Cl.⁵ ............................................. B65H 81/00
[52] U.S. Cl. ..................................... 156/173; 156/169; 156/172; 156/175; 156/187; 220/414; 220/589; 220/590
[58] Field of Search .............. 156/169, 173, 172, 187, 156/175; 220/414, 589, 590

[56] References Cited

U.S. PATENT DOCUMENTS

| | | | |
|---|---|---|---|
| 2,629,894 | 3/1953 | Boggs | 156/175 X |
| 2,751,237 | 6/1956 | Conley | 156/173 X |
| 2,848,133 | 8/1958 | Ramberg | 156/173 X |
| 2,878,038 | 3/1959 | Noland | 156/187 X |
| 3,124,001 | 3/1964 | Conley | 220/590 X |
| 3,562,063 | 2/1971 | Gibbs | 156/173 X |
| 3,850,722 | 11/1974 | Kreft | 156/172 |
| 4,614,279 | 9/1986 | Toth et al. | 156/173 X |
| 4,732,634 | 3/1988 | Hill et al. | 156/173 X |
| 5,004,120 | 4/1991 | Hembert | 220/414 X |
| 5,236,538 | 8/1993 | Rumberger | 156/173 X |

FOREIGN PATENT DOCUMENTS 63-242523  10/1988  Japan ................... 156/187

*Primary Examiner*—Jeff H. Aftergut
*Attorney, Agent, or Firm*—John R. Duncan; Frank D. Gilliam

[57] ABSTRACT

A method of manufacturing a fiber reinforced, resin matrix, tank with an integral fitting, such as an internally threaded pipe connection, bulkhead door or manhole entryway. A thread form tool having a cylindrical bore and a rounded pattern thread forming outer surface at one end is provided. The tool is secured to a drive shaft extending through the tank forming mandrel with the thread forming end adjacent to the mandrel. A second, thread is formed on the opposite end of the threat form tool opposite the tank mandrel and carries a consolidation nut. A consolidation washer rides on a wider cylinder surface of the thread form tool intermediate the two threaded ends. At least one fabric doily or band is placed over the thread forming tool rounded threads and the tank mandrel is filament wound with high strength fibers impregnated with a resin in a conventional manner, with filaments overlapping the rounded thread area. When sufficient filaments have been wound, the consolidation nut is tightened, driving the spacer and consolidation washer towards the filaments on the rounded thread region, consolidating the windings and forming a flat seating area substantially perpendicular to the mandrel axis. The resin is then cured and the thread forming tool assembly is removed.

6 Claims, 2 Drawing Sheets

METHOD FOR MANUFACTURING AN INTEGRAL THREADED CONNECTION FOR A COMPOSITE TANK

BACKGROUND OF THE INVENTION

This invention relates in general to fittings such as pipe connections, bulkhead doors or manhole covers for tanks and, more specifically, to a method of forming an integral internally threaded connection for a filament wound composite tank using the identical composite material to form the fitting and tank at the same time.

For aerospace applications in general, and space launch vehicle applications in particular, structural weight has the single greatest impact on vehicle performance and cost. Specifically, launch vehicles require large amounts of fuel to escape earth's gravitational forces and reach orbit. The quantity of fuel is strongly dependent upon the vehicle's structural weight and propulsion system. By decreasing overall weight and maintaining acceptable levels of structural strength and stiffness, overall vehicle performance can be greatly improved. Consequently, one effective method of evaluating a material's ability to maintain strength and decrease weight is to characterize the material by its specific strength and modulus (i.e., material strength and modulus divided by material density). High strength fiber reinforced, resin matrix composites exhibit specific strength and stiffness about 1.5 to 3 times greater than most structural metal alloys utilized in launch vehicles. Recent advances in fiber and resin technology show a trend toward continued improvement in composite specific properties.

Composite materials are typically orthotropic, which provides the very advantageous capability of tailoring the mechanical and/or physical properties of the composite for a specific structural application. This behavior is in contrast to conventional metal alloys, which generally exhibit isotropic properties. The advantages of the "material tailoring" approach are primarily realized as weight savings since designs need only use structural reinforcement (build-up) in areas and/or directions where maximum loads will occur.

Methods have been developed for manufacturing closed vessels, such as solid rocket motor casings and bottles or tanks for fluid storage, that use filament winding of resin impregnated fiber filaments, strands or tow about a mandrel. Typical mandrels are cylindrical structures with domed ends. The winding pattern, and number of layers, etc., may be selected to provide strength precisely where needed. For tanks, pipe connections are conventionally provided by positioning a metallic boss on the mandrel so that the filament windings cover and are bonded to the fitting. Disadvantages of this metal fitting approach include weight penalties, coefficient of thermal expansion (CTE) mismatches between the metal fitting and the composite tank and bonding problems between the metal fitting and the tank matrix resin.

Attempts have been made to form an internally threaded connection during filament winding without great success. In general, conventional threads in composite materials have been found to produce stress risers at the thread roots, weakening the fitting. Properly consolidating the composite material at the threads has been found to be difficult. In some cases, as described by Conley in U.S. Pat. No. 2,751,237 and Kemier et al. in U.S. Pat. No. 4,785,956 a different material than that used in the body of the vessel is used in the thread area, improving consolidation at the expense of differential CTE problems resulting from the use of non-identical materials for tank and fitting. End caps have been used at the ends of unthreaded integral fittings, as described by Thomas in Pat. No. 3,765,979, to shape the outer ends of integral fittings. However, these end caps do nothing to assure proper consolidation of the composite in these end areas. Complex, multilayer configurations have been used to attempt to increase the strength in integrally threaded areas, as described by Hill et al. in U.S. Pat. No. 4,602,480. Further, all of these patents describe sharply angled threads, which significantly increase stress at the roots and require the complex reinforcements described above.

Thus, there is a continuing need for improved methods of manufacturing filament wound composite tanks in which the tank and connection fitting are formed from the same material to eliminate differential CTE problems, stress concentrations at the fitting are avoided, proper consolidation of the composite material at the fitting is assured and a superior sealing surface is provided for a pipe connection or other fitting to be threaded into the connection fitting.

SUMMARY OF THE INVENTION

It is, therefore, an object of this invention to provide a method of manufacturing composite tanks or the like having integral fittings, which method overcomes the above-noted problems. Another object is to provide a manufacturing method that produces integral connection fittings during manufacture of the tank or other structure. A further object is to provide a manufacturing method providing improved material consolidation in the region of an integral fitting formed with a tank. Yet another object is to provide a tank and fitting manufacturing method that produces a flat, uniform, sealing surface at the end of an integral fitting. Still a further object is to form a composite fitting having a rounded thread form substantially eliminating significant stress risers at the threads.

The above noted objects, and others are accomplished in accordance with this invention, basically, by a method of manufacturing a composite tank, vessel, etc. which forms a filament wound connection fitting from identical composite materials during filament winding of the tank. A generally cylindrical thread forming tool is provided at a first end region with an outer surface bearing a rounded thread pattern. A cylindrical bore passes axially through the tool, adapted to be secured, as by a setscrew, to a drive shaft extending through and supporting a tank forming surface. The tank forming surface or mandrel may be a shell corresponding to the desired inner surface of the tank, made as detailed below.

The tool has a conventionally threaded region at the second end of the tool. Between the ends, a cylindrical region of greater diameter is provided. A toroidal consolidation washer has a bore sized to ride along the cylindrical region. A nut is threaded onto the threads at the second end and is adapted to drive the washer toward and away from the first end of said tool. All tool surfaces that will contact the composite material during forming is preferably coated with a conventional release coating.

With the tool in place on the drive shaft, adjacent to the tank forming surface, doilies or bands woven from the fiber to be used in forming the tank is placed over the rounded threads. The woven sheets provide "tailorability" of material characteristics in the thread, fitting and tank transition region, typically, by varying the orientation of the weave in two planes to combine with the windings to form a three-dimensional structure providing optimum strength in selected planes. This will provide a smooth, uniform thread surface. Filament winding of high strength fibers impregnated with a suitable resin is commenced in a conventional manner. The fiber wrap covers the tank sides, ends and the fitting. Any suitable winding pattern may be used. When sufficient filaments have been wound the tool nut is tightened, driving the washer toward the tool first end, against the composite material surrounding the tool first end. This pressure consolidates the composite together, eliminating any looseness and voids. At the same time the surface of the washer, which inherently lies perpendicular to the fitting and tank centerline, forms a flat, uniform surface at the outer end of the connection fitting.

The filament wound tank with the integral fitting are then processed to cure the resin. Typically, the resin is caret by heating in an autoclave or oven, exposure to ultraviolet, electron beam or other radiation, etc.

The nut is unthreaded, the washer removed and the tool is unthreaded out of the finished fitting. A pipe connection or the like, having a thread pattern corresponding to the rounded threads and a flange adjacent to the threads, can be threaded into the fitting. If desired, the male fitting can be formed and cured, or machined, from the same composite material as the tank and female fitting. The flange will form a tight, sealing relationship when brought against the flat outer surface of the fitting. A suitable sealing gasket, such as a fluorocarbon disk, may be placed carried on the flange to engage the flat fitting end to assure fluid tight sealing.

Since the fitting has the same coefficient of thermal expansion as the balance of the tank, there will no differential expansion where the tank is used at extreme temperatures, such as where cryogenic liquids such as liquid hydrogen are to be contained.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
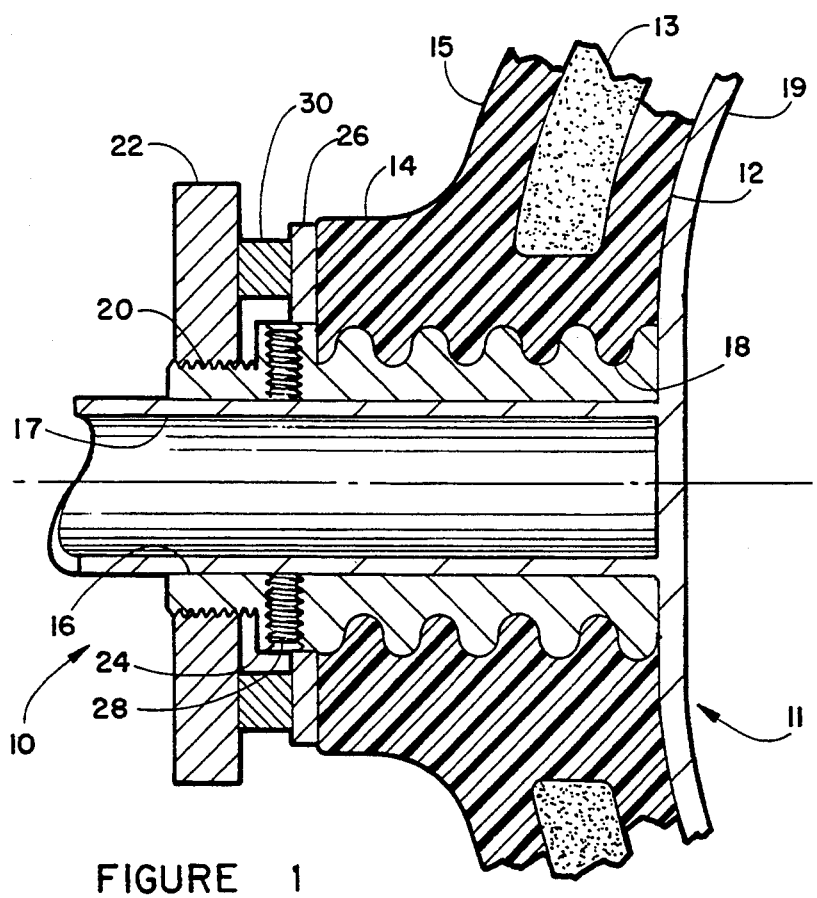
FIG. 1 is a schematic detail axial section through a connection fitting tool in place in a tank portion.
Figure 3:
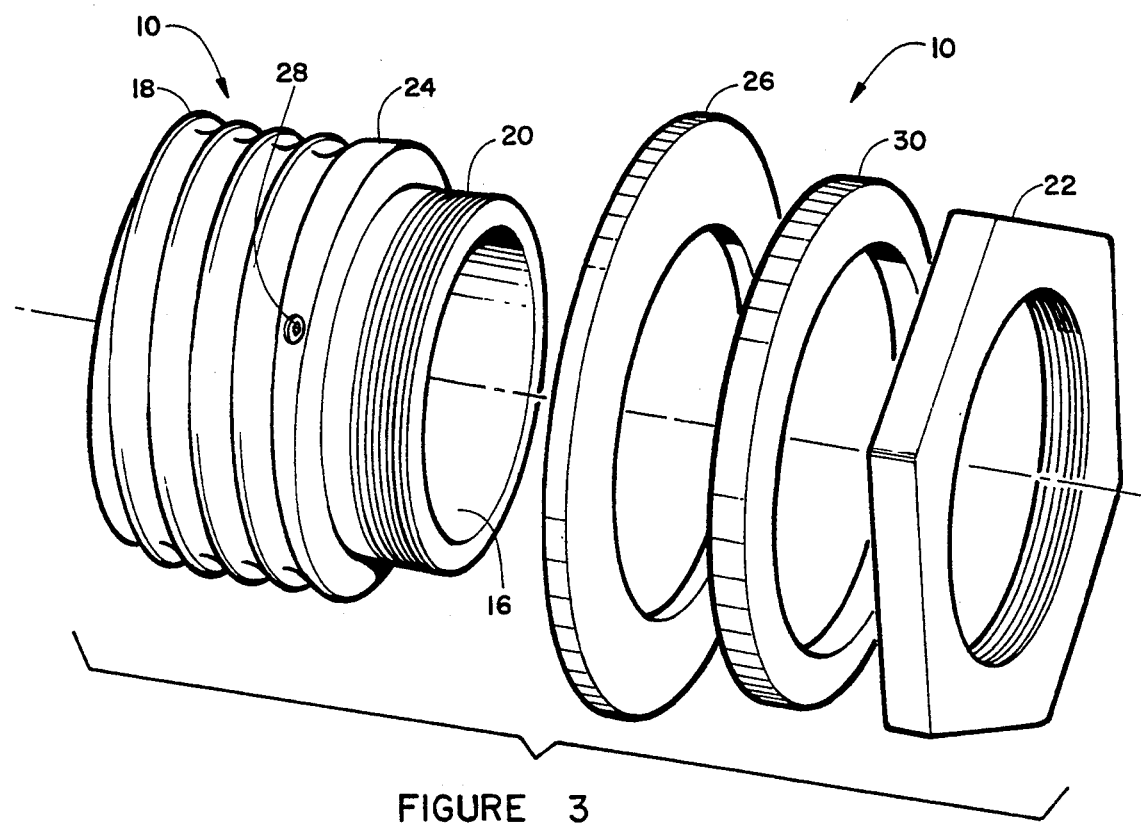
FIG. 3 is an exploded perspective view of the tool.

Referring to FIGS. 1 and 3, there is seen a tool 10 for forming an integral threaded connection fitting for use in simultaneously manufacturing a tank 11 and connection fitting 14 by basically conventional filament winding methods.

Tool 10 has a generally cylindrical configuration, with an axial bore 16 sized to fit a drive shaft 17 carrying a tank mandrel 19 for rotation of the mandrel and tool during filament winding. Rounded male threads 18 are formed at a first end of tool 10. These threads are reproduced in the composite fitting female threads. We have found that rounded threads, preferably having a sine wave cross section, avoid stress risers which result at the sharp roots of conventional threads. A conventional thread 20 onto which a nut 22 can be threaded is formed at the second end of tool 10. Intermediate the two threaded ends a wider cylindrical portion 24 is provided, along which a washer 26 can slide.

One or more transverse threaded holes 28 may be provided for setscrews (not shown) to hold tool 10 in a selected position on a drive shaft.

A toroidal spacer 30 is provided between nut 22 and washer 26 so that force can be transmitted from the nut to the washer as the nut is threaded onto threads 18.

In conventional filament winding of tanks and the like, a mandrel corresponding to the interior wall configuration 12 of the tank is secured over a drive shaft. As the assembly is rotated, a filament or filament tow, impregnated with a suitable resin, is fed to the mandrel in a selected pattern, to form a layer of filaments over the tank. The filaments are generally laid down in a combination of helical and radial layers, covering the generally cylindrical tank sides and the domed ends. In some cases, the mandrel is a thin composite or metal member and remains in the tank as an inner wall. In other cases, the tank is split around the center, the tank ends are slid off of the mandrel and bonded together with suitable splices or doublers at the cut line. In one particularly preferred method in the manufacture of all-composite tanks for cryogenic liquids, an inner composite layer 12 is formed on the mandrel, the layer is cured and cut into two ends which are removed from the mandrel. The ends are spliced back together and returned to the drive shaft. A layer of foam material 13 is applied, then an outer skin 15 is formed by filament winding. The result is a thermally insulated, all composite structure, tank.

In accordance with the method of this invention, an integral end fitting 34 is formed during filament winding of the tank 11, whatever filament winding and mandrel methods may be selected.

A mandrel 19 is placed on a drive shaft 17 and tool 10 is placed on the drive shaft with the threads 16 at the first tool end adjacent to the mandrel. Washer 26, spacer 30 and nut 22 may be loosely placed on tool 10 at this time or may be positioned later. Preferably at least one doily of fiber fabric is placed over threads 16 prior to filament winding to provide a smooth, uniform surface to the composite threads to be formed. The doily can be woven from the same filament material as is to be wound to form the tank and fitting. Alternatively, bands or other fabric configurations may be used.

Figure 4:
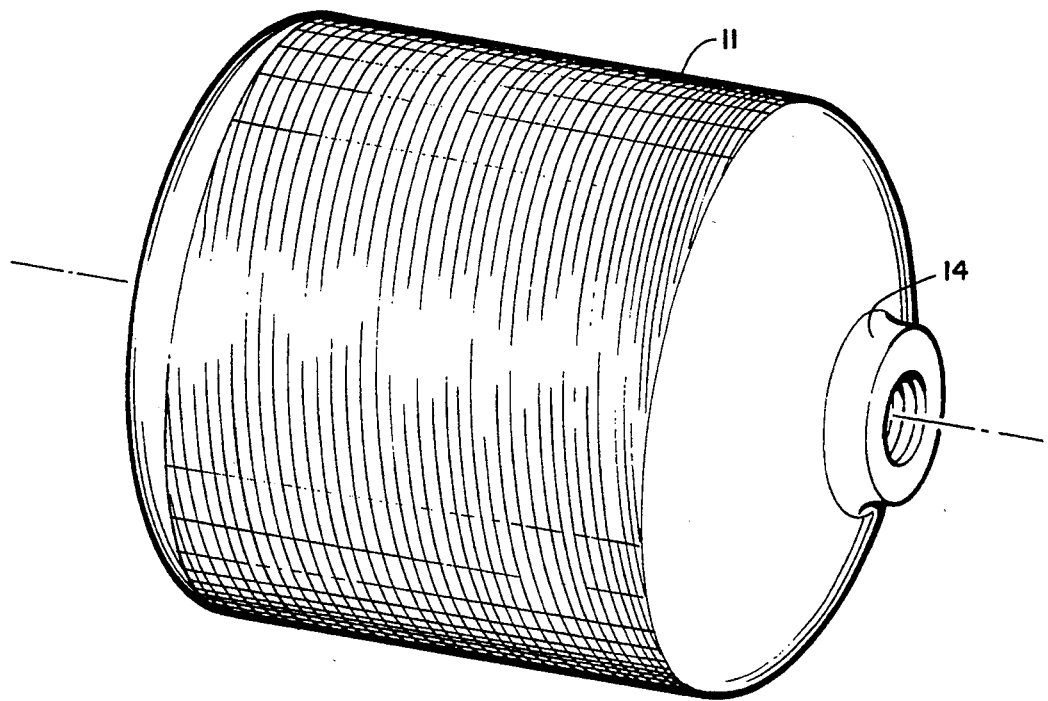
FIG. 4 is a perspective view of a completed tank with an integral connection fitting.

Filament winding is commenced, covering the tank mandrel 19 and threads 16. When winding is completed, nut 22 is tightened to drive washer 26 against the edge of the filament wound layer on threads 16. This consolidates the filament layers, eliminating any looseness or voids and provides a uniform, flat end surface on the composite over threads 16. If tank 11 is complete, tool 10 is removed and the end fitting is ready for use. Where inner and outer composite layers 12 and 15 are to be formed, with a foam inter-layer 13, the composite is at least partially cured after the inner composite layer is formed. The tank may be split transversely, mandrel 19 removed, the tank spliced and returned to the drive shaft. A layer of foam is applied in a conventional manner and filament winding commences to form the outer layer. Preferably, the inner layer covered threads 16 in a relatively thin layer. Nut 22 is backed off to allow the threads 16 to be covered to the full thickness desired. Upon completion of winding, nut 22 is tightened to force washer 26 against the composite material, consolidating the material and forming the flat end surface, substantially perpendicular to the tool axis. The assembly is then typically taken to an even or autoclave where the matrix resin is fully cured. Set screws holding tool 10 on the drive shaft are loosened, the tool is unthreaded from the now complete connection fitting and the tool and drive shaft are removed. The completed tank 11 appears as seen in FIG. 4, with a composite connection fitting 14 integral with the tank. No differential thermal expansion problems will occur since the fitting and tank are formed from the same fiber and matrix materials.

Figure 2:
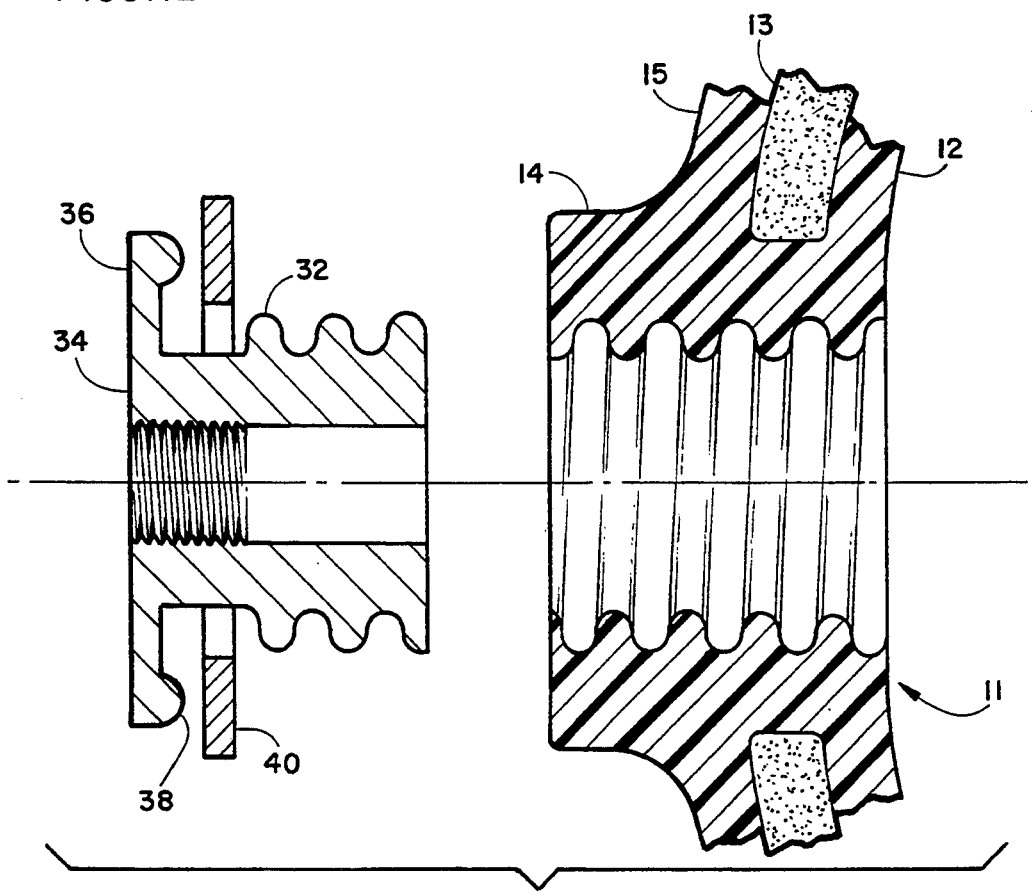
FIG. 2 is a schematic detail axial section through a completed connection fitting and pipe fitting for use therewith.

While therefor any conventional pipe fitting or the like, having the proper male threads 32, may be used, the configuration shown in FIG. 2 is particularly referred. Fitting 34 has rounded threads at one end corresponding to threads 16 in the connection fitting 14. A flange 36, which may be flat or have the preferred lip 38, is provided adjacent to the end of threads 32. While not always necessary, an elastomeric sealing gasket 40 is preferably placed adjacent to lip 38. As fitting 34 is threaded into connection fitting 14, gasket 40 will come into sealing contact with the uniform, flat end surface on connection fitting 14. Thus, a tight seal is achieved.

Such a tank is particularly useful for containing cryogenic liquids, such as liquid hydrogen or the like as used in space launch vehicles. While certain preferred material, dimensions and other parameters were detailed in the above description of preferred embodiments, those may be varied, where suitable, with similar results. For example, integral connection fittings can be formed during filament winding of a variety of different structures in addition to the tanks described. Other applications, variations and ramifications of this invention will occur to those skilled in the art upon reading this disclosure. Those are intended to be included within the scope of this invention, as defined in the appended claims.

What is claimed is:

1. A method of manufacturing a tank and integral connection fitting from composite materials comprising high strength fibers in a resin matrix, which comprises:
   providing a mandrel having a desired tank internal configuration;
   providing a drive shaft passing through said mandrel and through an area where a connection fitting is desired;
   providing a generally cylindrical tool having an internal bore corresponding to said drive shaft, a first end with a rounded external thread, a second end having a second thread and an intermediate cylindrical region having a diameter greater that said threaded ends;
   securing said tool to said drive shaft with said first end adjacent to said mandrel;
   placing at least one piece of woven material over said rounded threads;
   filament winding an outer surface of said mandrel and said first end of said tool with high strength fiber filaments impregnated with a matrix resin, the composition of said filaments being the same as the composition of the fibers used to weave said woven material;
   placing a toroidal, flat, washer having a bore corresponding the diameter of said intermediate region over said intermediate region;
   threading a nut onto said second end threads to drive said washer toward and against the windings over said first end so that said washer compresses and consolidates those windings and shapes an end of said windings to a flat, uniform surface, substantially perpendicular to the axis of rotation of said cylindrical tool;
   curing said matrix resin to at least a shape retaining state; and
   removing said tool.

2. The method according to claim 1 further including the step of positioning a toroidal spacer between said nut and said washer to deliver the threading force from said nut to said washer.

3. The method according to claim 1 including the further step of connecting said connection fitting to a pipe system by providing a generally tubular fitting having a threaded outer surface at one end corresponding to said rounded threads, and a flange adjacent to said threaded outer surface, said flange lying in a plane substantially perpendicular to the axis of said tubular fitting, and threading said tubular fitting into said connection fitting until said flange sealingly engages the flat end surface of said connection fitting.

4. The method according to claim 3 further including the step of placing an elastomeric gasket between said flange and said composite fitting end surface to assure fluid tight sealing therebetween.

5. The method according to claim 4 further including forming a circular lip on said flange positioned to engage said gasket when said tubular fitting is threaded into said connection fitting.

6. The method according to claim 1 wherein said rounded thread has a substantially sine wave axial section.

* * * * *